Jan. 23, 1968 W. G. SACK 3,364,775
VARIABLE RATIO TRANSMISSION
Filed Oct. 1, 1965 4 Sheets-Sheet 3

INVENTOR.
WILLIAM G. SACK
BY Hill, Sherman, Meroni, Gross & Simpson
ATTORNEYS

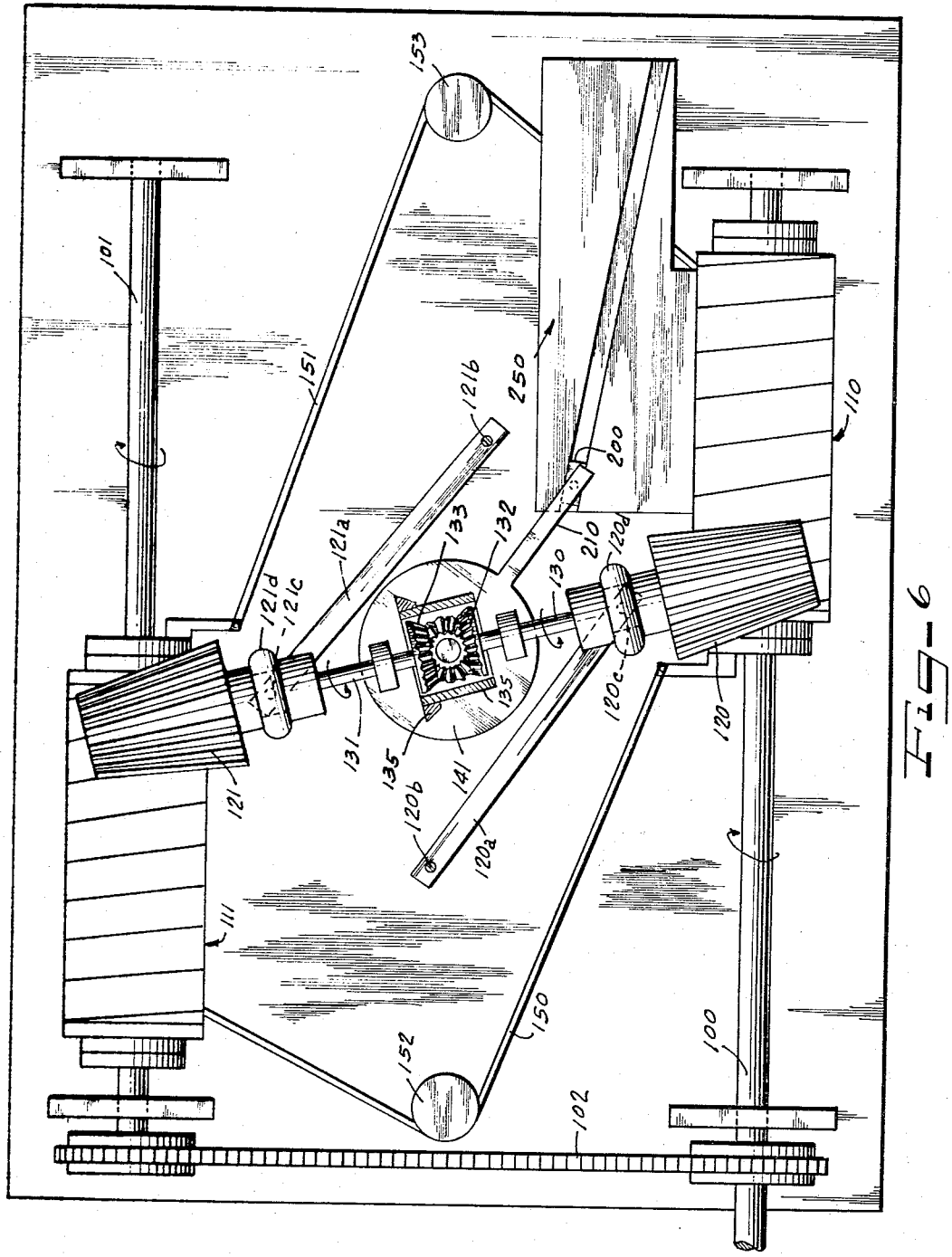

United States Patent Office 3,364,775
Patented Jan. 23, 1968

3,364,775
VARIABLE RATIO TRANSMISSION
William G. Sack, 9410 S. Avers Ave.,
Evergreen Park, Ill. 60642
Filed Oct. 1, 1965, Ser. No. 491,942
10 Claims. (Cl. 74—425.5)

ABSTRACT OF THE DISCLOSURE

The device described herein comprises a mechanical transmission providing a wide variation in ratio. A worm having a plurality of helical threads of increasing pitch, each thread being axially spaced from a preceding thread, is provided in combination with a worm follower having its axis of rotation adjustably movable with respect to the axis of the worm to thereby provide proper worm-worm follower alignment throughout the ratio range. Ratio changes are accomplished by movement of the follower axially along the worm without disengagement therefrom.

It has long been an object of those working in the power transmission field to provide a smoothly, substantially continuously, variable mechanical transmission that is simple to manipulate from one ratio change to another. To my knowledge, however, no truly satisfactory transmission of this type has in fact been found. Instead, the positive directness of a purely mechanical power transmission system has been sacrificed in general usage by combination mechanical and hydraulic gear transmission systems in which variations in ratio change are accomplished, if accomplished at all, by way of systems having built-in slack, or by the incorporation of relatively inefficient hydraulic couplings in the drive system for purposes of smoothing the transition for one ratio to another.

I am, of course, aware that variable ratio transmissions have been constructed with the provision of a multiple ratio worm cooperating with a constant ratio worm follower. However, in my experience, none of these prior devices provide means for changing the ratio of the system in a relatively smooth, substantially uniform manner. Instead, in such prior devices known to me, the multiple ratio worm employed in the system has been constructed of a plurality of separate sections only one of which is in drive relation at any given time.

In accordance with the principles of the present invention, a variable ratio system is provided in which a large number of individual sections of worm thread are provided along the length of a worm. The individual sections are separated slightly from each other in a manner permitting utilization of a worm follower which will contact and be driven by one or more immediately adjacent differently pitched worm threads. As a result of this construction, it has been possible to provide a variable ratio system in which the ratio change may readily be accomplished by simple manipulation of the worm follower relative to the worm without disengagement of these parts from each other. Further, by providing a constantly increasing effective pitch or lead to the worm, with a constant degree of change from one thread to the next, coupled with a cooperating, constantly linearly changing, follower angle, statisfactory load transfer is accomplished throughout the range of ratio variation. Additionally, by providing an overlap of worm and worm follower tooth contact such that the follower is capable of making direct sequential load bearing engagement with adjacent worm threads, an average of the ratios of the two worm threads is achievable, thereby providing a substantially continuously varying ratio change throughout the range of the system rather than merely a plurality of individual ratio changes. This is a particularly desirable feature where it is desired that the ratio change system of the invention be employed as a counting, indexing, or other similar device in which the number of revolutions of the input relative to the output is more significant than the instantaneous angular velocity of the components during any portion of a single revolution. Where it is considered important that the instantaneous angular velocity be substantially constant and hence that the ouput be balanced throughout each complete revolution while still providing an average intermediate ratio, an embodiment providing a pair of counterbalanced, opposed, worm and worm followers is available for this purpose.

It is, accordingly, an object of the present invention to provide an improved variable ratio transmission system for the mechanical transfer of power.

Another object of the present invention is to provide a continuously variable ratio transmission system of the worm and worm follower type.

A feature of the invention resides in the provision of a worm having a plurality of threads each of which approximately completely encircles the worm and successive threads of which have an increasing lead.

Another feature of the invention resides in the provision of a variable lead worm engageable with a worm follower mounted for rotation about an axis generally transverse to the axis of rotation of the worm and movable longitudinally of the worm.

Still a further object of the invention is to provide a balanced continuously variable worm and worm follower transmission system.

Still other and further objects and features of the present invention will at once become apparent to those skilled in the art from a consideration of the attached drawings wherein several embodiments of my invention are shown by way of illustration only, and wherein:

FIGURE 5 is a sectional view of the teeth of the worm follower; and

FIGURE 6 is a plan view of a dual, balanced, variable ratio transmission constructed in accordance with the present invention and comprising a modified form of the invention shown in FIGURES 1 through 4.

As shown on the drawings:

Figure 1:
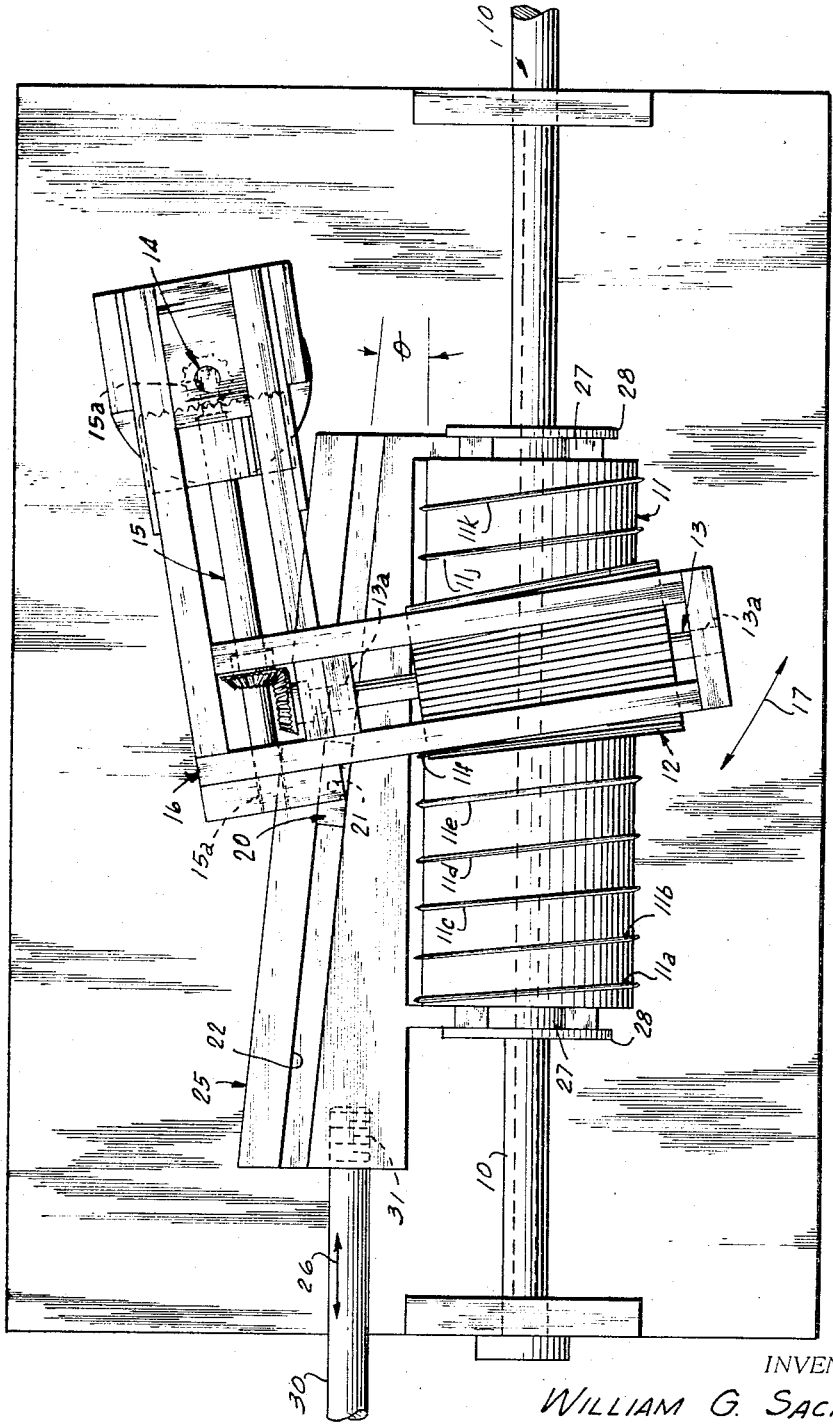
FIGURE 1 is a plan view of a transmission constructed in accordance with the principles of the present invention.
Figure 2:
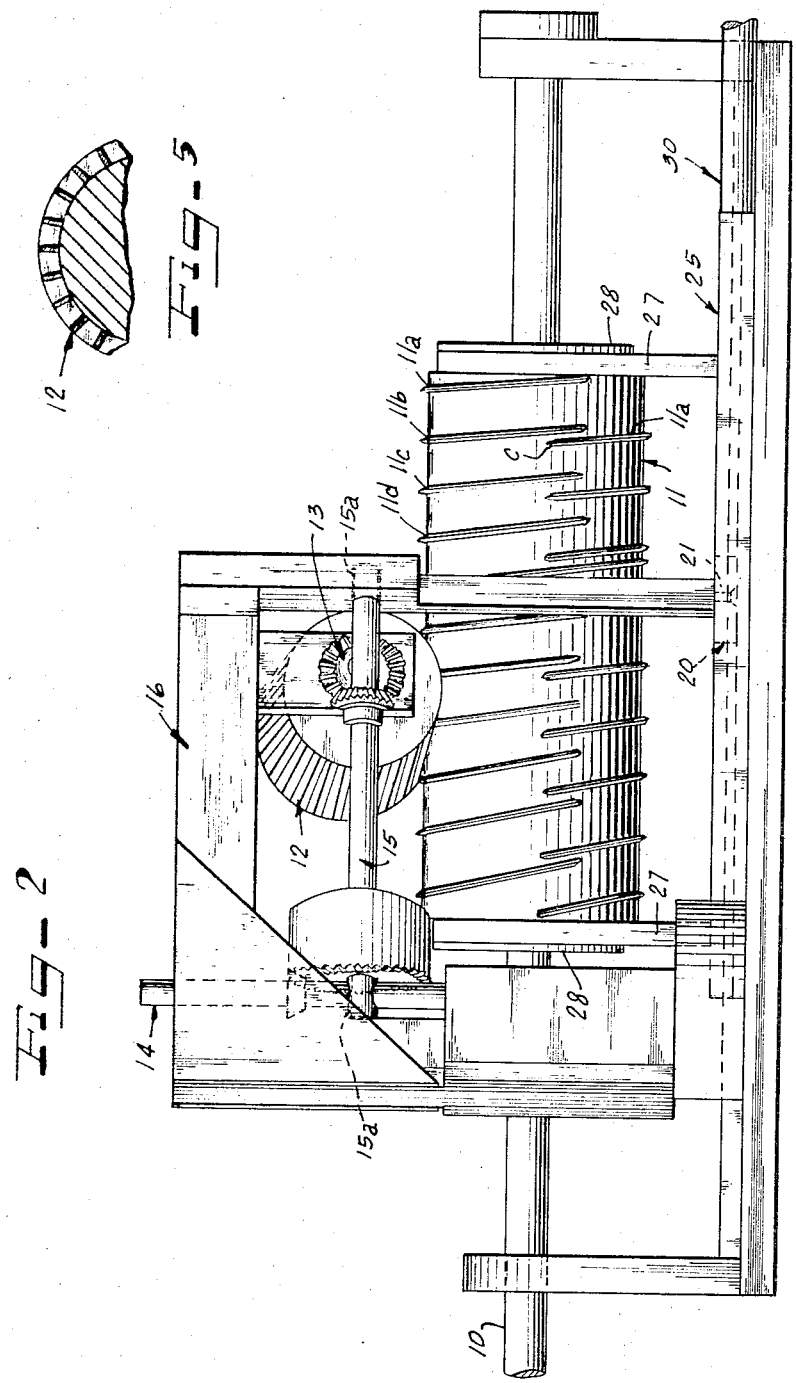
FIGURE 2 is a side-elevational view of the transmission construction illustrated in FIGURE 1.
Figure 3:
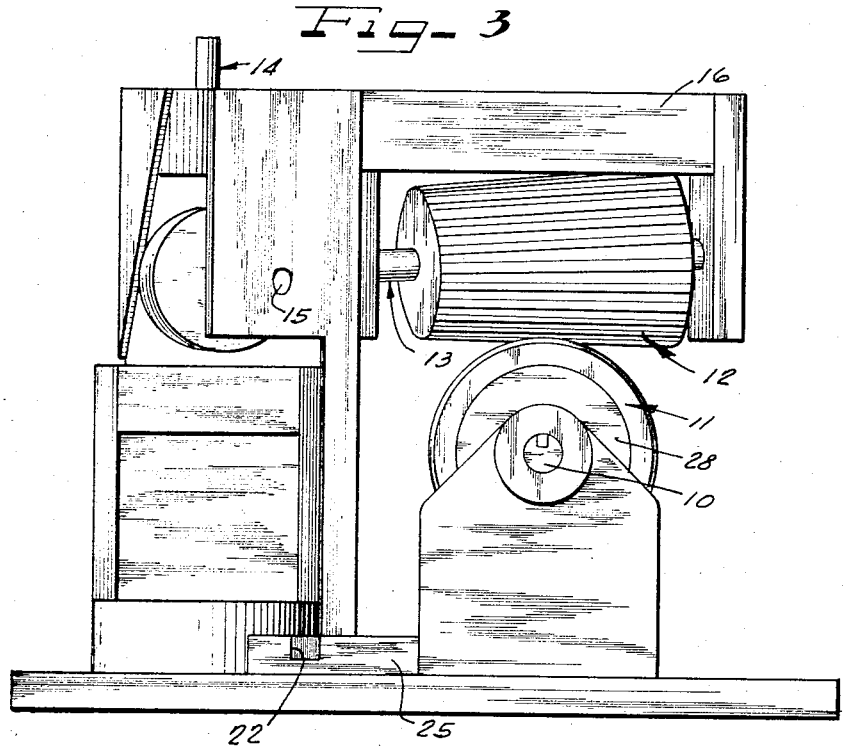
FIGURE 3 is an end-elevational view of the transmission taken from the right-hand end of FIGURE 2.

As may be seen from a consideration of FIGURES 1 through 4, one embodiment of my present invention utilizes a drive shaft 10 having a driving worm 11 longitudinally slidably splined thereto for rotation therewith. A worm follower 12 is secured for rotation with worm follower shaft 13 rotatable about an axis generally transverse to the axis of rotation of the worm 11. The follower shaft 13 is, in the embodiment illustrated, connected to the power output shaft of the transmission 14 by way of an intermediate shaft 15. It will be apparent, however, that the shaft 13 may be directly connected to the output shaft 14 in the form illustrated by way of a flexible shaft, if desired.

In the arrangement shown, output shaft 14 not only provides for the transmission of power from the apparatus but also acts as a bearing for pivotally supporting the frame 116 for oscillating in the arcuate path indicated by arrow 17. The frame 16 is a rigid L-shaped member supporting the shaft 13 at bearings 13a and the intermediate shaft 15 at bearings 15a. The angular position of the frame 16 is determined by means of a slide block 20 pivotally secured to the frame 16 at 21 and slidable in the trough or groove 22 of the worm positioning member 25. Shifting of the member 25 in the direction of arrows 26, along the shaft 10, will manifestly cause oscillation of the frame 16 about the axis of the shaft 14 in the path of the arrow 17. This automatically aligns the follower 12 with the worm thread as the lead of the thread is changed. In practice an angle $\theta = 7°$, and a cone angle on follower 12 providing an angle of approximately 1/2° between follower teeth coupled with the worm 11 of the illustrative dimensions stated below, giving approximately 1° between adjacent worm threads, will provide maximum worm-follower tooth contact throughout each rotation of the worm.

The drive worm 11 is connected to the shifting member 25 by way of forks 27 rigidly carried by the member 25 and cooperable with yokes 28 carried by the ends of the worm 11 and rotatable therewith. Shifting of the transmission is accomplished by reciprocal movement of the member 25 in the direction of the arrow 26 by means of a sliding shaft 30 threadedly or otherwise rigidly secured to the shifting member 25 at 31. The shaft 30 may be reciprocated by a lever or any desirable manual manipulating means. Alternatively, it will be understood that the shaft 30 may be controlled by a governor mechanism or any other automatic system considered desirable for effecting transmission shifting and hence ratio change.

The pivotal motion of the follower 12, above described, is essential since the lead of the worm 11 changes along the length of the worm. Accordingly, movement of the shifting member 25 toward the right as viewed in FIGURE 1 will cause clockwise oscillation of the frame 16 and a somewhat more vertical positioning of the follower shaft 13 as viewed in FIGURE 1. Simultaneously, the follower 12 will be in contact with a first worm thread 11a of low pitch, providing a minimum gear reduction. As the member 25 is moved toward the left as viewed in FIGURE 1, the follower 12 progressively contacts worm threads 11b through 11k. Each of the threads 11a through 11k is at a different pitch, the pitch of each thread preferably being constant. Further, the change in lead from one thread to the next adjacent thread is substantially constant in a manner that will now be discussed.

Figure 4:
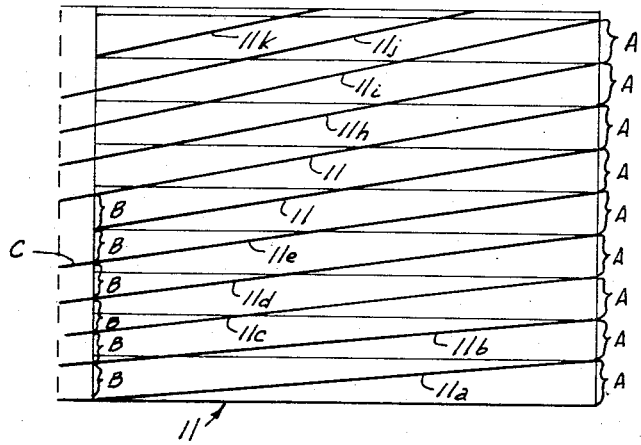
FIGURE 4 is a chart illustrating the layout of the variable lead worm employed in accordance with the teachings of my invention.

The variation in lead provided for the individual worm threads 11a through 11k may be more clearly understood from a consideration of FIGURE 4 where the leads are shown in developed form. There, the first thread 11a clearly has a lead equal to A. The second thread 11b encircles the worm 11 overlapping itself by an amount C and starts, axially removed from the starting point of thread 11a, by space B. It is intended that the ends of all of the threads 11a through 11k be similarly spaced by the dimension A and that the effective beginnings of all of the threads be spaced by the dimension B, the difference $A-B$ being substantially spaced between adjacent teeth on the worm follower 12 so that as the worm 11 rotates, the worm follower will smoothly accommodate passage of the overlapping areas, perhaps best seen in FIGURE 2, without any binding. Thus, the dimension $A-B$ is constant but the lead of each consecutive thread increases. Thus, the lead of thread 11a is, as above noted, equal to A; the lead of thread 11b is equal to $2A-B$; the lead of thread 11c equals $3A-2B$; the lead of thread 11d equals $4A-3B$; the lead of 11e equals $5A-4B$; the lead of thread 11f equals $6A-5B$; and so forth. Thus, for example, if the dimension A equals 1¼" while the dimension B equals 1", the lead for thread 11a would comprise 1¼" per revolution while the lead of thread 11k would comprise 3¾" per revolution or, in other words, a 300% increase in effective lead or ratio.

It will be apparent to those skilled in the field that various dimension may be employed to provide a satisfactory apparatus. I have found in constructing satisfactorily operable mechanism, that a very satisfactory arrangement may be provided incorporating a dimension $A=1"$ and $B=1¼"$ with a thread on the worm projecting ¼" from the surface of the cylinder and having a thread tooth width, along the axis of the cylinder of approximately ⅛". In constructing the tooth, the tooth is rounded along its peripheral surface and is tapered at its ends to eliminate any possibility of interference as the follower cooperates with the worm threads in driving or shifting. Similarly, in a satisfactory operated construction, the follower was provided with a tooth width of ⅛" and projecting ¼" from the surface of the follower. In this apparatus the worm was 11½" long with a diameter, at the cylinder, of 4¾" while the follower comprised a frusto-conical member having a maximum diameter of 3¼" and a minimum diameter of 2⅞" at the tooth root with an axial length of approximately 5". In this arrangement, the space between teeth of the follower comprised 5/32". The tooth form of the follower may be seen from a consideration of FIGURE 5 and is essentially the same as the form of the tooth on the worm, namely a substantially parallel wall tooth rounded at its outer surface.

It will be appreciated from a consideration of the drawings and the above dimensional facts, that mechanical play is built into the transmission to assure freedom of movement of the components in shifting motions and to prevent binding. Thus, at the point of thread overlap on the worm, it will be observed that, except when actually aligned, the minimum space between the end of one thread and the beginning of the next is ¼" which will permit ready passage of the ⅛" thread of the follower as it moves from thread to thread at this point. Further, by providing a ¼" difference in the dimension $A-B$ and providing a ⅛" thread thickness, the follower may be shifted axially of the worm at any point in the position of the worm and at the same time the worm may continuously rotate the follower with the follower in contact with a pair of adjacent threads in a manner such that the follower is constantly driven by at least one of the threads in driving contact relation with the next adjacent thread picking up or dropping contact with the follower, as the case may be, without binding.

It will further be apparent to those in the field, that the system above described is not one of constant angular velocity of the follower throughout its range of contact with the worm. Constant velocity would, of course, be provided if the follower were in contact with only one thread in any given instance. While it is possible for the follower to be in such a circumstance, i.e., in contact with one only of the individual threads 11a through 11k, an important advantage of the present system is that the follower may be positioned axially of the worm in such a manner as to be between adjacent single thread contact conditions. In such circumstances, the follower contacts one thread throughout part of the revolution of the worm and the immediately adjacent thread throughout the remainder of the rotation of the worm. In such circumstances, the follower will rotate at a different rate of angular velocity throughout part of a revolution of the worm, the resultant follower output being an average of the two rates. For purposes of indexing, and similar procedures in which the number of revolutions is important while the angular velocity is less important, such a system is perfectly adequate and provides substantially infinite ratio variation between the limits provided in the system. However, in order to provide for constant velocity output independently of the exact positioning of the follower relative to the worm, a balanced output may be provided through the utilization of a pair of worm and worm follower devices balanced to an output shaft by way of a differential gear. Such an arrangement is diagrammatically illustrated in FIGURE 6.

As illustrated in FIGURE 6, the input drive to the transmission is provided by shaft 100 which drives countershaft 101 in the same direction of rotation by means of a chain or other similar drive 102. Shafts 100, 101, drive respectively, variable worms 110 and 111 having leads, as shown in FIGURE 6, running in the same direction but in reverse orders of increasing pitch. A pair of worm followers 120, 121 cooperate, respectively with the worms 110, 111 and are splined for slidable driving relation to output shafts 130, 131. The shafts 130, 131 carry bevel gears 132, 133 forming a part of conventional differential, the output gear 135 of which drives bevel gear 136 on a single output shaft immediately below, and not visible in FIGURE 6. In view of the fact that shafts 130, 131 rotate in the same direction and are connected via a differential gear to the output shaft, the angular accelerations of the individual followers 120, 121 effectively average each other. Accordingly, in the initial alignment of the system, the shafts 100, 101 are 180° out of phase with respect to each other, thereby effectively averaging the ratio and also the angular velocity of the proposed systems.

Shifting of the variable ratio worms 110, 111 is preferably synchronized so that a single shifting device may be employed. This may be seen from a consideration of FIGURE 6 wherein the shifting block 250 operates to directly shift worm 110 and simultaneously adjust the rotary support 141 to adjust the position of followers 120, 121 so that the tooth in contact with the worm is parallel to the portion of the worm thread immediately therebeneath. As in the preceding case, the support 141 is controlled in its rotational movement by means of a follower block 200 cooperating with element 210 rigid with mount 141. With rotational movement of the mounting 141 the follower 120 is moved toward and away from the worm 110 to provide proper contact by means of the connecting pivot 120a pivoted at 120b to the fixed frame and at 120c to yoke 120d rotatable but not reciprocal relative to the follower 120. A balanced pulley and cable arrangement is provided to assure simultaneous movement of worms 110, 111. This is shown at 150 and 151, which comprise cables directly connected to the mount for the worms 110, 111 and which are trained over respective pulleys 152, 153. With this arrangement, movement of the shifting block 250 simultaneously moves both worms. Movement of the follower 121 longitudinally of its shaft 131 is accomplished in the manner identical with that of worm 120, by means of a pivot link 121a pivoted to the frame at 121b and to yoke 121d by means of pivot 121c.

As above noted, the balanced construction schematically illustrated in FIGURE 6 provides the system in which the instantaneous angular velocities of the output followers are balanced to provide a balanced, average, output at the final output shaft. It will be appreciated of course that while pulley and cable connections are illustrated for providing simultaneous movement of the worms, this simultaneous actuation may readily be accomplished by means of mechanical linkages or gears, as desired.

It will be manifest to those skilled in the art of automatic transmissions, that a number of variants may be employed without departing from the novel concepts of my invention. For example, the generally cylindrical form of the worms 110, 111 provides a very satisfactory transmission; but the worms may, if desired, be generally conical. The precise configuration of the cylindrical or conical base upon which the plurality of worm threads is placed merely determines the general configuration of the follower element and, as may readily be seen, the change in ratio is accomplished by variations in the lead of the individual worm thread with a single revolution of the worm. While the worm followers illustrated all employ generally longitudinally extending teeth to provide increased tooth contact surfaces, it will be noted that the follower may comprise a disc having radial pin teeth if desired. In such circumstances the axis of the follower need not be shifted. It will be further apparent that while only forward speeds have been illustrated in the present embodiments, the worm may be provided with a neutral and reverse portion immediately adjacent the low ratio end of the worm. This would, of course, provide a full range of reverse, neutral, and forward speeds for the transmission with smooth shifting.

In view of the many changes that may be constructed without departing from the inventive scope of my invention, it is my intention that the scope of the invention be limited solely by that of the hereinafer appended claims.

I claim as my invention:

1. In combination in a variable ratio transmission, a worm mounted for rotation about its longitudinal axis, an output follower for rotation about an axis of rotation generally transverse to the axis of said worm, said worm comprising a plurality of threads each extending helically around the worm and consecutive threads of which are of increasing lead, the end of each succeeding thread being spaced axially from the beginning of the then next adjacent thread by a distance approximating a multiple of the space between teeth on said follower, and means for axially moving said worm relative to said follower without disengagement therebetween.

2. The transmission of claim 1 wherein said worm comprises a substantially cylindrical member with radially projecting threads thereon.

3. In combination in a variable ratio transmission, a worm mounted for rotation about its longitudinal axis, an output follower for rotation about an axis of rotation generally transverse to the axis of said worm, said worm comprising a plurality of threads each extending helically around the worm and consecutive threads of which are of increasing lead, the end of each succeeding thread of said worm being directly aligned with or spaced axially from the beginning of the then next adjacent thread by a distance approximating a multiple of the space between teeth on said follower, the difference in lead between adjacent threads being substantially constant, and means for axially moving said worm relative to said follower without disengagement therefrom.

4. The transmission of claim 3 wherein said worm comprises a substantially cylindrical member with radially projecting threads thereon.

5. In combination in a variable ratio transmission, a worm mounted for rotation about its longitudinal axis, an output follower mounted for rotation about an axis of rotation generally transverse to the axis of said worm, said worm comprising a plurality of threads each extending helically around the worm and being of successively different pitches, the end of each succeeding thread of said worm being aligned with or spaced from the beginning of the then next adjacent thread by a distance approximating a multiple of the space between teeth on said follower, means for shifting said worm relative to said follower along the axis of said worm for causing said follower to contact different threads on said worm, and means for shifting the axis of said follower automatically with shifting of said worm to cause the axis of the follower to lie substantially parallel to the thread in contact therewith at the point of contact therewith.

6. In combination in a variable ratio transmission, a worm mounted for rotation about its longitudinal axis, an output follower for rotation about an axis of rotation generally transverse to the axis of said worm, said worm comprising a plurality of threads each extending helically around the worm and consecutive threads of which are of increasing lead, the end of each succeeding thread of said worm being directly aligned with or spaced axially from the beginning of the then next adjacent thread by a distance approximating a multiple of the space between teeth on said follower, the difference in lead between adjacent threads being substantially constant, means for axially moving said worm relative to said follower without disengagement therefrom, and means for shifting the axis of said follower automatically with shifting of said worm to cause the axis of the follower to lie substantially parallel to the worm thread at the point of contact therewith.

7. In combination in a variable ratio transmission, a worm mounted for rotation about its longitudinal axis, an output follower for rotation about an axis of rotation generally transverse to the axis of said worm, said worm comprising a plurality of threads each extending helically around the worm and consecutive threads of which are of increasing lead, the end of each succeeding thread of said worm being directly aligned with or spaced axially from the beginning of the then next adjacent thread by a distance approximating a multiple of the space between teeth on said follower, the difference in lead between adjacent threads being substantially constant, means for axially moving said worm relative to said follower without disengagement therefrom, said follower being generally frusto-conical in configuration to provide an angle between adjacent follower teeth approximately 50% as great as the angle between adjacent threads of said worm, and means for shifting the axis of said follower automatically with shifting of said worm to cause the axis of the follower to lie substantially parallel to the worm thread at the point of contact between the follower and the worm.

8. In combination in a variable ratio transmission, a pair of worms mounted for rotation about their longitudinal axes and having their axes substantially parallel, a support shaft a pair of output followers mounted on said shaft for rotation about an axis of rotation generally transverse to the axes of said worms, each said worm comprising a plurality of threads extending helically around the respective worm and being of successively different pitches, the ends of increasing pitch of said worms being oppositely directed, means pivotally mounting the axis of said followers about a point between said worms, means for simultaneously shifting said worms longitudinally of their axes, means automatically connecting said worms to the said support shaft of said followers whereby shifting of said worms automatically rotate said worm follower axis to maintain the axis of said followers substantially parallel to the respective worm threads in contact therewith.

9. In combination in a variable ratio transmission, a pair of worms mounted for rotation about their longitudinal axes and having their axes substantially parallel, a support shaft a pair of output followers mounted on said shaft for rotation about an axis of rotation generally transverse to the axes of said worms, each said worm comprising a plurality of threads extending helically around the respective worm and being of successively different pitches, the ends of increasing pitch of said worms being oppositely directed, means pivotally mounting the axis of said followers about a point between said worms, means for simultaneously shifting said worms longitudinally of their axes, means automatically connecting said worms to the said support shaft of said followers whereby shifting of said worms automatically rotate said worm follower axis to maintain the axis of said followers substantially parallel to the respective worm threads in contact therewith, said followers each comprising a generally frusto-conical configuration having teeth running generally longitudinally thereof and having an angle therebetween approximately one-half as great as the angle between successive worm threads whereby maximum contact between the teeth of the follower and the respective worm is assured.

10. In combination in a variable ratio transmission, a pair of worms mounted for rotation about their longitudinal axes and having their axes substantially parallel, a support shaft a pair of output followers mounted on said shaft for rotation about an axis of rotation generally transverse to the axes of said worms, each said worm comprising a plurality of threads extending helically around the respective worm and being of successively different pitches, the ends of increasing pitch of said worms being oppositely directed, means pivotally mounting the axis of said followers about a point between said worms, means for simultaneously shifting said worms longitudinally of their axes, means automatically connecting said worms to the said support shaft of said followers whereby shifting of said worms automatically rotate said worm follower axis to maintain the axis of said followers substantially parallel to the respective worm threads in contact therewith, said worms being 180° out of phase with each other and differential gear means connecting said followers to a single output whereby the output from the individual follower is instantaneously averaged.

References Cited

UNITED STATES PATENTS

| | | | |
|---|---|---|---|
| 1,046,156 | 12/1912 | Dreisbach | 74—425.5 |
| 1,080,503 | 12/1913 | Ulrich | 74—425.5 |
| 1,313,776 | 8/1919 | Worpitz | 74—425.5 |
| 1,641,692 | 9/1927 | Pratt | 74—425.5 |
| 1,710,855 | 4/1929 | Baker | 74—425.5 |
| 1,754,697 | 4/1930 | Saglioni | 74—425.5 |
| 2,578,893 | 12/1951 | Massare et al. | 74—425.5 |

DONLEY J. STOCKING, *Primary Examiner.*

L. H. GERIN, *Assistant Examiner.*